(12) United States Patent
Serlet

(10) Patent No.: US 8,606,854 B2
(45) Date of Patent: Dec. 10, 2013

(54) SYSTEM AND METHOD FOR OPPORTUNISTIC IMAGE SHARING

(75) Inventor: Bertrand Philippe Serlet, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1515 days.

(21) Appl. No.: 11/970,644

(22) Filed: Jan. 8, 2008

(65) Prior Publication Data

US 2008/0216092 A1 Sep. 4, 2008

Related U.S. Application Data

(60) Provisional application No. 60/883,968, filed on Jan. 8, 2007.

(51) Int. Cl.
G06F 15/16 (2006.01)

(52) U.S. Cl.
USPC .......................................... 709/204; 709/206

(58) Field of Classification Search
USPC .................................................. 709/204, 206
See application file for complete search history.

(56) References Cited

U.S. PATENT DOCUMENTS

| | | | |
|---|---|---|---|
| 6,298,228 B1 | 10/2001 | Singh | |
| 6,701,348 B2 | 3/2004 | Sommerer | |
| 6,754,665 B1 | 6/2004 | Futagami | |
| 7,058,686 B2 | 6/2006 | Jin | |
| 7,627,311 B2 * | 12/2009 | Oijer | 455/415 |
| 7,752,282 B2 | 7/2010 | Noda | |
| 8,176,131 B2 | 5/2012 | Masonis | |
| 2001/0056469 A1 | 12/2001 | Oonuki | |
| 2002/0052921 A1 | 5/2002 | Morkel | |
| 2002/0080413 A1 | 6/2002 | Sommerer | |
| 2003/0101065 A1 | 5/2003 | Rohall | |
| 2003/0158860 A1 | 8/2003 | Caughey | |
| 2003/0220977 A1 | 11/2003 | Malik | |
| 2003/0236769 A1 | 12/2003 | Pyhalammi | |
| 2004/0059786 A1 | 3/2004 | Caughey | |
| 2004/0068499 A1 | 4/2004 | Adar | |
| 2004/0070678 A1 | 4/2004 | Toyama | |
| 2004/0179672 A1 | 9/2004 | Pagel | |
| 2004/0185883 A1 | 9/2004 | Rukman | |
| 2005/0091074 A1 | 4/2005 | Feldhahn | |
| 2005/0091272 A1 | 4/2005 | Smith | |
| 2005/0223072 A1 | 10/2005 | Greve | |
| 2006/0027648 A1 | 2/2006 | Cheah | |
| 2006/0069809 A1 | 3/2006 | Serlet | |
| 2006/0075053 A1 | 4/2006 | Xu | |
| 2006/0080284 A1 | 4/2006 | Masonis | |

(Continued)

*Primary Examiner* — Andy Ho

(74) *Attorney, Agent, or Firm* — Wong, Cabello, Lutsch, Rutherford & Brucculeri, LLP

(57) ABSTRACT

A system for requesting data from another includes means for automatically appending a request for certain information to an outgoing message. In one embodiment, an e-mail editor provides the sender-user with an option for causing the email to include a request for missing or desired contact information, such as a picture. The appended request may be in the form of an added e-mail header, e.g. "I need your picture." On the receiving side of the email, the incoming messages may be parsed for such requests. Any requests that are found in incoming email may be remembered by the receiving system using a dedicated data structure or some indications (e.g. flags) in an existing data structure. When email is composed on the receiving system, the "remembered" request information may be used to facilitate responses to pending requests. In this manner, email correspondents may opportunistically use their email traffic to maintain updated information regarding each other.

24 Claims, 2 Drawing Sheets

(56) References Cited

U.S. PATENT DOCUMENTS

| | | |
|---|---|---|
| 2006/0095524 A1 | 5/2006 | Kay |
| 2006/0168072 A1* | 7/2006 | Park .......................... 709/206 |
| 2007/0130329 A1 | 6/2007 | Shah |
| 2007/0152036 A1 | 7/2007 | Daigle |
| 2007/0192418 A1 | 8/2007 | Adams |
| 2007/0219958 A1 | 9/2007 | Park |
| 2007/0250550 A1 | 10/2007 | Berninger |
| 2008/0022220 A1 | 1/2008 | Cheah |
| 2008/0037720 A1 | 2/2008 | Thomson |
| 2008/0114649 A1 | 5/2008 | Swirsky |
| 2008/0208971 A1 | 8/2008 | Costin |
| 2009/0054091 A1 | 2/2009 | van Wijk |
| 2009/0131013 A1 | 5/2009 | Saiin |
| 2009/0157717 A1 | 6/2009 | Palahnuk |
| 2009/0222493 A1 | 9/2009 | Smarr |
| 2009/0292785 A1 | 11/2009 | Leedberg |
| 2010/0299388 A1 | 11/2010 | Bolnick |
| 2011/0087747 A1 | 4/2011 | Hirst |
| 2011/0302255 A1* | 12/2011 | Miller et al. .................. 709/206 |

* cited by examiner

SYSTEM AND METHOD FOR OPPORTUNISTIC IMAGE SHARING

CROSS-REFERENCE TO RELATED APPLICATIONS

This application claims the benefit of U.S. Provisional Application No. 60/883,968 filed Jan. 8, 2007.

STATEMENT REGARDING FEDERALLY SPONSORED RESEARCH OR DEVELOPMENT none

BACKGROUND OF THE INVENTION

1. Field of the Invention

This invention relates to data sharing between processor-based systems. More particularly, it relates to systems and methods for opportunistically populating and updating pictures or other information in the various data fields of a Personal Information Manager program or other programs in which structured data is replicated across multiple nodes.

2. Description of the Related Art

One of the most common applications for personal computers is the storage and management of personal information, one example of which is contact information—a person's name, title, telephone number(s), location, e-mail address, picture, avitar and the like. Similar information may be stored and retrieved for business entities and other organizations.

As the size, cost and power requirements of microprocessors and data storage devices have decreased, applications for personal information management have moved to other processor-based systems such as Personal Digital Assistants (PDA's), Smart Phones, electronic address books and the like.

A personal information manager (PIM) is a type of application software that functions as a personal organizer. As an information management tool, a PIM's purpose is to facilitate the recording, tracking, and management of certain types of "personal information". Personal information can include any of the following: personal notes/journal entries; address books; lists (including task lists); significant calendar dates (e.g., birthdays, anniversaries and appointments), e-mail and/or instant message archives, fax communications, voice-mail and project management features.

One method of the prior art for exchanging contact information is the so-called vCard. vCard is a file format standard for personal data interchange, specifically electronic business cards. vCards are often attached to e-mail messages, but can be exchanged in other ways, such as on the World Wide Web. They can contain name and address information, phone numbers, URLs, logos, photographs, and even audio clips. However, because of the relatively large size of the files required, photographs, other images or avitars are typically omitted from conventional methods of contact information exchange.

The vCard or Versitcard was originally proposed in 1995 by the Versit consortium, which consisted of Apple Computer, AT&T (later Lucent), IBM and Siemens. In December 1996 ownership of the format was transferred to the Internet Mail Consortium, a trade association for companies with an interest in Internet e-mail.

Version 2.1 of the vCard standard is widely supported by e-mail clients. Version 3.0 of the vCard format is an Internet Engineering Task Force (IETF) standards-track proposal contained in REC 2425 and RFC 2426. The commonly-used filename extension for vCards is .vcf.

Some PIM software products of the prior art are capable of synchronizing data with another PIM over a computer network (including mobile ad-hoc networks). This feature usually does not allow for continuous, concurrent data updates, but rather enables point-in-time updating between different computers, including desktop computers, laptop computers, and personal digital assistants.

Many methods exist for communicating via a data network. Instant messaging and e-mail are among the methods most commonly used by individuals. E-mail (electronic mail) is a store-and-forward method of composing, sending, storing, and receiving messages over electronic communication systems. E-mail may refer to both the Internet e-mail system based on the Simple Mail Transfer Protocol (SMTP) and to intranet systems that allow users within one organization to e-mail each other. E-mail messages are generally sent to an e-mail server that stores received messages in the recipient's e-mail mailbox. The user subsequently retrieves these messages with either a web browser or an e-mail client that uses one of a number of e-mail retrieval protocols. While some clients and servers preferentially use vendor-specific, typically proprietary protocols, most support the Internet standard protocols SMTP for sending e-mail and POP3 and IMAP4 for retrieving e-mail, allowing interoperability with other servers and clients. The Internet Message Access Protocol (commonly known as IMAP or IMAP4, and previously called Internet Mail Access Protocol, Interactive Mail Access Protocol, or Interim Mail Access Protocol) is an application layer Internet protocol that allows a local client to access e-mail on a remote server. IMAP4 and POP3 (Post Office Protocol version 3) are perhaps the two most prevalent Internet standard protocols for e-mail retrieval. E-mail clients can generally be configured to use either POP3 or IMAP4 to retrieve e-mail and in both cases use SMTP for sending. Many e-mail clients and servers support both protocols.

An e-mail message header consists of fields, usually including at least the following: 1) From: The e-mail address, and optionally the name of the sender; 2) To: The e-mail address[es], and optionally name[s] of the message's recipient[s]; 3) Subject: A brief summary of the contents of the message; and, 4) Date: The local time and date when the message was written.

Each header field has a name and a value. RFC 2822 (a formalized memorandum addressing Internet standards) specifies the precise syntax. Informally, the field name starts in the first character of a line, followed by a followed by the value, which is continued on non-null subsequent lines that have a space or tab as their first character. Field names and values are generally restricted to 7-bit ASCII characters. Non-ASCII values may be represented using Multipurpose Internet Mail Extensions (MIME) encoded words.

The "To" field in the header is not necessarily related to the addresses to which the message is delivered. The actual delivery list may be supplied in the SMTP protocol (thus, not extracted from the header content). The "To" field is similar to the greeting at the top of a conventional letter which is delivered according to the address on the outer envelope. Likewise, the "From" field does not have to be the real sender of the e-mail message.

Other common header fields include: "Cc:" (carbon copy); "Bcc:" (Blind Carbon Copy); "Received:" (Tracking information generated by mail servers that have previously handled a message); "Content-Type:" (Information about how the message has to be displayed, usually a MIME type); "Reply-To:" (Address that should be used to reply to the sender); "References:" (Message-ID of the message that this is a reply to, and the message-id of this message, etc.); "In-Reply-To:" (Message-ID of the message that this is a reply to); and, "X-Face:" (Small icon.). For further reference, the Internet Assigned Numbers Authority (IANA) maintains a list of standard header fields.

Instant messaging requires the use of a client program that hooks up an instant messaging service and differs from e-mail in that conversations are then able to happen in real-time or near real-time (whole lines of text being transmitted and displayed rather than letter-by-letter communication). There are many disparate protocols for instant messaging. However, this situation is typically dealt with by combining protocols inside the IM client application or inside the IM server application.

One, increasingly-popular object for storage and management with a PIM application is a picture (image) of an individual whose other personal information is stored. However, in practice, this piece of information is often missing. Also, the structured data a user has stored on a given system may be out-of-date even for those persons with whom the user frequently communicates. What is needed is an automatic or semi-automatic means for obtaining missing information and for updating previously-stored structured data using e-mail or other commonly-used messaging systems.

BRIEF SUMMARY OF THE INVENTION

A processor-based communications system is configured to opportunistically request and/or receive certain information (data) from a remote system. One specific embodiment uses common email traffic to implement opportunistic request for information, and an opportunistic response to the request. For example, most contact databases contain very few pictures or avatar, so the opportunistic system may be used to request a photograph or avatar. In particular, a user ("Sender") may be sending an email for some purpose such as to arrange a meeting. When the Sender composes that message, the invention contemplates an opportunity for the Sender to include a request for information, such as the recipient's picture, avatar or other PIM information. The invention contemplates that the Sender's system may facilitate the request by providing various prompting, menu options, buttons or widgets that assist with appending the request. Upon the Sender's indication, the request may be appending in the form of a header or otherwise (e.g. a header stating "I need your picture."). Upon composing an email, the Sender's system may even use the recipient address information to query the Sender's contacts database (or PIM program) to identify any PIM information that is appropriate for a request. The system could then prompt the Sender to suggest that a request be made for some desirable information (perhaps information that is missing or stale in the Sender's contacts). When the email is received at the recipient's node, the invention contemplates that the recipient's system may automatically recognize the Sender's request. The recipient's system may then note the request by setting flag or otherwise storing an association between the Sender and the request. Then, when the recipient replies or otherwise sends an email to the original Sender, the recipient's system can send the requested information and clear the flag. Of course, the recipient's system may use menu's, prompts, widgets or buttons to gain the recipient's approval or instructions regarding the matter. In sum, this opportunistic request/exchange embodiment can keep contact databases (or other PIMs) completely updated during the normal course of email traffic.

In certain embodiments, a request for information is appended to a message being composed by the user either automatically or in response to user-activation of the feature. In another illustrative example, a request for an electronic photograph of the recipient of an e-mail message for inclusion with the other contact information stored on the sender's system. In some embodiments of the invention, the system is configured to parse incoming messages for the requesting information which may be automatically extracted and stored. In yet other embodiments, the system alerts the user to missing or outdated information and offers to append a request for new information to a message being composed. Recipients may be categorized and the information request tailored to the category of the recipient.

A system according to the present invention may be implemented on either or both of the sending side system or the receiving side system. Increased automation of the process is possible when both sending and receiving systems are configured in compatible implementations of the invention.

BRIEF DESCRIPTION OF THE SEVERAL VIEWS OF THE DRAWING(S)

DETAILED DESCRIPTION OF THE INVENTION

Figure 1:
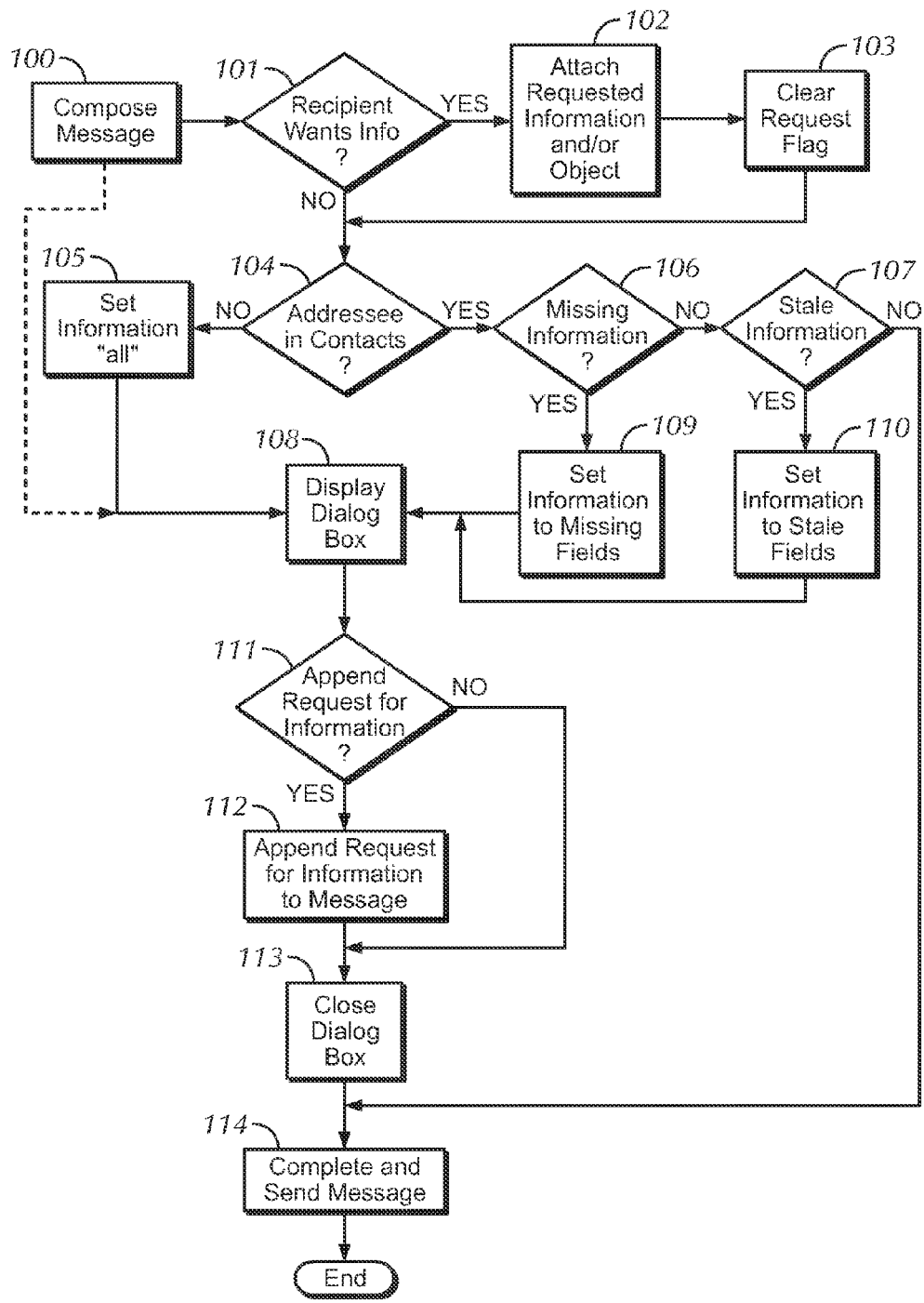
FIG. 1 is a flowchart depicting the steps in one embodiment of the invention.

The invention may best be understood by reference to certain preferred embodiments. A number of different preferred embodiments are disclosed below.

In one embodiment, a programmed system may use email to create an opportunistic data sharing arrangement between the sender and receiver of an email. For example, a sender may wish to send an email to a recipient for some reason other than data exchange. Upon the sender's indication to compose an email, the sender's system may present the sender with the option to include a data request with the email being composed. Perhaps the sender's system may prompt the sender by inquiring if the sender wishes to request a picture from the user (the request may be for any information such as PIM information or an avatar). In certain embodiments, the option may be presented to the user with a menu of items which may be requested from the recipient. The menu may include a text box for "other information" into which the sender may insert a custom or user-specific request. In addition, in certain embodiments, the menu or options may be altered according to data or metadata missing from the local PIM database or otherwise tagged a desirable to the sender (i.e., the sender's system may intelligently provide a prompt, or intelligently respond to the sender's instructions). Furthermore, the presented option may take the form of a "radio button" or pop-up dialog box in an e-mail editor or other program associated with composition of an electronic communication.

Thus, in our example, the sender is presented with an option of adding a request for an electronic photograph to an email, or potentially any other particular communication being sent electronically to another. By selecting the option, the sender may append a request to the email for an electronic photograph of the recipient (or other PIM information or data of any type, particularly structured data). The request may take any form, either visible or invisible to the user. A preferred embodiment uses a special email header to signal the request for information. Ultimately, the sender sends the email to the recipient with the request included.

When the email is received at the recipient's node, the invention contemplates that the recipient's system may recognize the sender's request. The recognition may be automatic, by for example, parsing incoming messages; or the recipient may instruct the system to note any requests. The recipient's instruction may be in the form of a button selection, menu navigation or even preference setting (or any other mechanism for user interaction with the system). The recipient's system may then employ a mechanism to remember that a request has been made. For example, the recipient's system may keep a list or other data structure bearing information regarding the request and other similar requests. Alternatively, the recipient's system may remember the request by setting one or more flags in the local email program or PIM program (e.g. a flag for each requested datum requested). In one preferred embodiment, the request is remembered using a mechanism that associates information about the request with the sender or sendor's email address.

Once a request has been received and remembered, one embodiment of the invention contemplates acting on the request opportunistically, e.g., when the recipient replies or otherwise sends an email to the original sender. Thus, when the recipient writes to the original sender (either as a reply or otherwise), the system can send the requested information and clear the flag or other remembering mechanism. Of course, the recipient's system may use menu's, prompts, widgets or buttons to gain the recipient's approval or instructions regarding the responsive information. Furthermore, in order to offer a desirable level of automation, the recipients system may examine its pending requests each time an email is composed.

Thus, this somewhat lengthy example shows how an opportunistic request/exchange embodiment can keep coherency among corresponding datum retained on remote nodes. Moreover, with only a minor extrapolation, one may recognize that in practice, each node may be both a sender and recipient. Therefore, in some embodiments, when an email is composed the system will both (1) perform a protocol for requesting information from the recipient, (2) perform a protocol for responding to pending (remembered) requests.

A basic implementation of the process described above is illustrated in flowchart form in FIG. 1 (dashed lines). A user may begin composing a message using, e.g., an e-mail editor (block 100). The system may detect that a new message is being drafted and display a dialog box (at 108) asking the user whether he or she wishes to append a request for contact information to the message being composed. If the user responds in the affirmative ("yes" branch at 111), the system automatically appends a request for information to the communication (at 112) and closes the dialog box (block 113). The user may then complete the composition of the message and send it in the usual method at block 114.

In certain embodiments, the system may be configured to search the user's system for the requested data and, if found, request confirmation from the user that the request should be appended or sent notwithstanding the data found. The search may check a repository for a designated application or Personal Information Management [Manager] application. Alternatively, the search may involve a check of all applicable repositories for data of a certain type on the user's system. The system may also determine whether a certain recipient has a pending request for information and, if so, take the opportunity to "piggyback" the requested information on the message being composed.

Such a process is also shown within the flowchart of FIG. 1. The user begins a new communication by selecting one or more recipients for the message at block 100. At diamond 101, the system determines whether a recipient has a pending request for information from the sender. If so, (yes branch at 101), the system may automatically attached the requested information (e.g., a photo) at block 102 and then clear a request flag (at block 103) for that particular recipient (a request flay may be set to preserve the indication of a pending request). At diamond 104, the system (potentially in the background) may determine whether contact information exists on the system for the recipient(s). If not ("no" branch at 104), the needed information is set to "all" (block 105), a dialog box is displayed to the user (at 108) asking whether a request for information should be appended to the message being composed and, if the reply is affirmative ("yes" branch at 111), a request for all contact information from the recipient is appended to the message being composed (block 112). The dialog box is then closed (block 113) and the user may complete the composition of the message and send it in the usual way (block 114).

In similar fashion, if a contact record exists on the system for the recipient ("yes" branch at 104) but certain fields have missing data ("yes" branch at 106), the information request can be customized for that missing data (block 109). Data which may be out-of-date may likewise be tested for at diamond 107 and, if found ("yes" branch at 107) may result in a request for updated information (at block 110). Of course, in practice, diamonds 106 and 107 may be combined or interchanged so that either or both of missing/stale data may be checked in a single pass or in any order.

In another embodiment, an e-mail program interfaces with a Personal Information Manager program to request missing and/or updated information. Running in the background, the program searches the data currently of record for the person or persons in the recipient field of the e-mail being composed by the user. Missing and/or stale information may be flagged. The program may then automatically append a request to the e-mail asking the recipient to reply with the missing data. The request may be in the form of a header added to the e-mail. The author of the e-mail may be presented with a query by the system asking whether the requested for information should be appended. Alternatively, the system may be provided with an on-screen "radio button" or icon which may be activated by the user to cause the system to add a request for information to the outgoing e-mail message.

For example, a user may begin composing a message to Jane Doe by first entering the recipient's e-mail address in the "to" field of the message. While the e-mail editor continues to run in the foreground, the program would query the database of the Personal Information Manager in the background to determine what, if any, information is available on the system for Jane Doe. Alternatively, the query may be performed upon the user's indication—for example, from a drop-down menu or dedicated on-screen "button." Common data fields in the contacts portion of a personal information manager may include a person's name, title, business phone number, business fax number, home phone number, mobile phone number, postal address, e-mail address, website URL and photograph.

In the illustrative example, let's say that the user's system has a contact entry for "Jane Doe" but is missing any entry in the fax phone number and photograph fields. If this feature were enabled by the user, the program might add a header that signals the recipient's e-mail application that the sender is requesting the recipient's fax number and photograph. In certain embodiments, the header may be displayed to the recipient. In other embodiments, the added header may be concealed (in normal operation) and used only to signal the receiving system to provide an automatic response (either immediately in a dedicated message or opportunistically in a later message).

In certain embodiments of the invention, the program may monitor incoming e-mail to detect receipt of a reply message. To continue the illustrative example, subsequent to sending the request for missing information, the program may test incoming e-mails to identify those received from Jane Doe. The program may then parse the text of the message for the requested data and insert it into the appropriate fields of the contacts database. If the message includes an attached file, the file type may be examined to determine whether it is in an image file format. If so, the program may assume the image file contains the requested photo and store that image in the personal information manager as a contact photo. Alternatively, the system may display the photo and query the user as to whether the program should store the displayed image as the photo of "Jane Doe."

Figure 2:
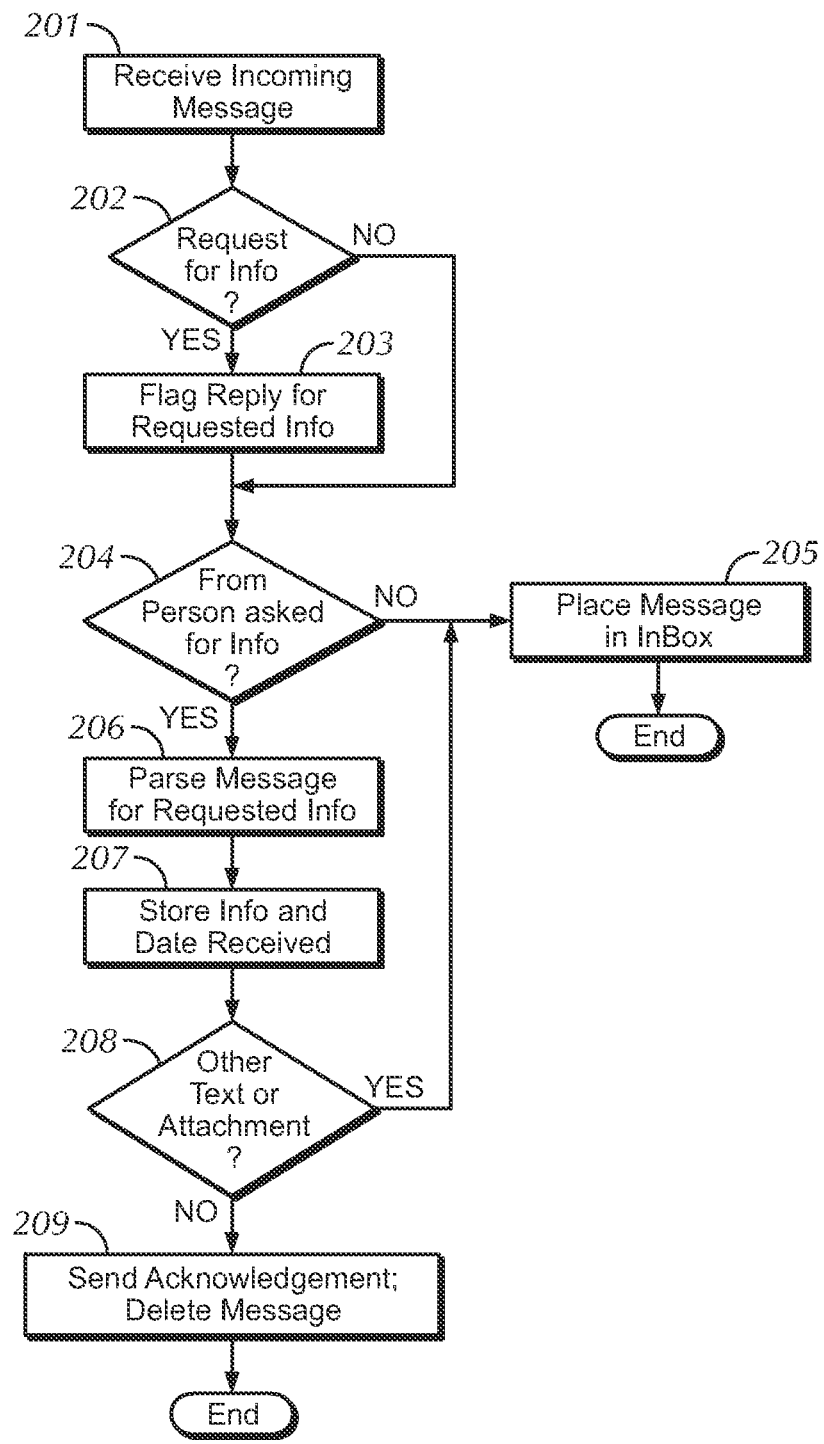
FIG. 2 is a flowchart depicting the steps in a second embodiment of the invention.

An embodiment which monitors incoming communications for previously-requested information is shown in the flowchart of FIG. 2. A message is received by the system at block 201. At diamond 202, the incoming message may be tested to determine whether it contains a request for information—e.g., whether it has an added header with a request set. If so ("yes" branch at 202), a flag may be set by the system such that when a message is about to be sent to the sender of the message received at block 201, the requested in-formation may be added [see diamond 101 in FIG. 1]. The sender's identity is compared to a stored list of persons to whom the system has sent requests for information at 204. If the message is not from such a person, it may be placed in the system's inbox (at block 205). If the message is from someone who owes the user data, the system parses the body and/or subject line of the message for the requested information (block 206). If the requested information is identified, the information is stored at block 207 and the date of receipt may be associated with the data for subsequent testing of the currency of the data. The system may parse the entire contents of the communication to determine whether any additional message is in the communication or if a file is attached (diamond 208) and if so, place it in the inbox for the user's action (205). If no other information is in the communication, the system may optionally dispatch an acknowledgement to the sender and delete the message (block 209 thereby requiring no involvement on the part of the user.

It will be appreciated that the above-described embodiments of the invention do not require any additional protocol beyond that required for the exchange of e-mail or other text-based communication. Typically, protocols are essential for the interoperability of systems; programs which send data to each other need to be based on some agreements on the format of the data and related issues. However, certain embodiments of the invention may be implemented without requiring the responding system to adhere to a particular protocol—the missing data may simply be extracted from a reply e-mail, instant message, or the like by parsing the reply.

As discussed above, in some embodiments of the invention, the "freshness" of data may be used as a criterion for requesting data or maintaining data. For example, a program may associate a freshness indication or modification date with the data in each field of a contact entry. Alternatively, the most recent date of data entry (or some indication of freshness) for a given contact may be stored. As described above, the program may query the database of contact information associated with the recipient(s) of an e-mail message being composed and determine whether the age of the stored data exceeds a pre-selected limit. The limit may be user-selected or fixed by the program. If the data might be stale—i.e., is older than the pre-selected limit—the program may offer to append a message to the e-mail requesting updated data. The program may then monitor incoming e-mail (or other text-based communications) for a reply message containing the requested data. If a reply message is identified, the program may parse the message for changed data and insert that data into a database. In certain embodiments, a "date stamp" may be associated with the data and stored in the database for later use in, e.g., assessing the data's currency.

Certain embodiments may include a program which runs on the recipient's system and acts to quickly retrieve and send the requested information back to the requestor's system with minimal involvement on the part of the recipient. Such a program may be made available for downloading from a website (or network connection), and the requester may send a link to the website in a communication sent to the recipient. Alternatively, the message sent to the recipient by the requester may include the program as an attachment. In certain embodiments, the program may be in the form of a self-extracting compressed file.

Such a program (whether downloaded or e-mailed) may be configured to query the recipient for the identity of the particular Personal Information Manager in use on the recipient's system and then retrieve the requested information from that application and return it (e.g., by e-mail) to the requester. Other potential sources of commonly-sought information may be found in other self-identifying formats such as vCards, business cards, in-case-of-emergency (ICE) cards, system set-up information, system registration data, etc. In certain embodiments, the program may be configured to run a set-up routine if PIM data is not identified on the host system. Such a routine may display a form for data input from the user in order to create and store an electronic business card, v-card or the like on the recipient's system.

In yet other embodiments, contact information and the like may be exchanged using a website or other network-accessible object. For example, a website (which may be a secure website) may be configured to permit data to be both uploaded and downloaded in a standard format. Access to the website may be restricted by user ID's and passwords or other means known in the art. A first user may enter information (which may be contact information) in a form provided on the website. A second user may subsequently retrieve and store that information on their own system. In certain embodiments, the system may be configured to automatically forward data to one or more recipients either incrementally or periodically for user-selected or automatic integration in the user's system. The system may be configured to identify updates. Changes in the data may be flagged or a date may be associated with certain data fields so that a downloading system may automatically compare its stored data and update its records, as needed.

A website implementing certain embodiments of the invention may be configured to cause automatic testing of a system accessing the website to determine and display a user's options for complying with a request for certain information. For example, a determination may be made that there is data present and the methods available for transferring the data. In some embodiments, the data transfer may proceed automatically while in other embodiments the transfer may only proceed if the user signals agreement.

In certain embodiments, the above-described features may be enabled by the user (or system administrator) by e.g. setting system preferences, PIM preferences, e-mail preferences, or the like. For example, a given system may be configured to display a dialog box that, when sending a message, asks the user whether to request certain data from the recipient of the message. The data might be specific data, e.g., a picture of the recipient; missing data; data on the user's system that is older than a threshold value; or, all data necessary to create a new contact entry. In certain embodiments, the dialog box may present the requested data type for user selection.

It will be apparent to those skilled in the art that many permutations of data request triggering conditions may be selected and implemented on a system according to the present invention. For example, a request for data may be automatically made for a designated group (list) of recipients (e.g., those recipients in the user's contacts or a designated subset of a group), or a request for data may be made for every recipient or every recipient not on a list of exceptions. Likewise, groups of recipients on an exception list of groups may be excluded from an automatic request for information. As an additional feature, in certain embodiments a list may be maintained of contacts to whom the user wants to send data, e.g., a picture. Alternatively, separate lists may be maintained for each type of data and/or recipients who have requested data.

Various embodiments of the invention may be implemented on a processor-based system configured to receive messages from a remote system(s)—e.g., e-mail, Instant Messages, etc. Systems of the prior art offer the user the option of creating a new contact (record) based on the sender's address and/or updating the records of an existing contact. In one embodiment of the present invention, the receipt or opening of a newly-received message may trigger the display of a dialog box which asks the user whether a reply message should be dispatched to the sender asking for specific information. A menu of information may be displayed for user selection. The menu may identify missing information and may display existing, related information which may include a query as to whether updated or more recent information should be requested from the sender. As described previously, the request to be sent may include an invitation to reply with a coded message—e.g., a specific "subject" field—which the sending system may search for in incoming messages and if found parse the message for the requested information and automatically update the system's stored records (or create a new record).

One particular embodiment of the invention comprises stored programs on both the sender's and the recipient's programmed systems for implementing the process. Such an embodiment provides ease of implementation with minimal involvement on the part of the users. Such systems may be configured such that users merely set preferences to designate the potential disposition of different pieces of data and an exchange of data may occur without any active user involvement (other than setting preferences).

For example, by setting appropriate preferences, a user might enable the automatic sending of name, business address and business phone number(s) in response to a request from any compatible system. However, the system might be configured (again, by user preference settings) to only send an image of the user to a requesting system if the requester were a member of the users personal contacts. In certain embodiments, if a requester who is not a personal contact were to request an image of the user, the system may display a dialog box asking the user's permission to send the image to the specific requester. For certain types of sensitive information (e.g., financial information, credit card numbers, bank account numbers, etc.) a password or other type of security measure may be employed as part of the approval-to-send process. Thus, even in situations that may require user interaction, the user's involvement may be limited to a simple yes/no response to a dialog box or selecting certain information to be sent from a presented listing of available information.

In yet other two-sided embodiments (i.e., embodiments wherein both sending and receiving systems are programmed with compatible software), a user might embed two contact cards in each message sent—one card containing contact information for the sender and the other the contact information for the recipient stored on the sender's system. The receiving system may be configured to analyze the contact information sent to determine whether it matches the information stored on the receiving system. If necessary, correction or updating may proceed automatically (or with specific approval of the user). Similarly, a discrepancy with the recipient's contact information may trigger an automatic reply to the sender with corrected information. The original sender may be prompted to accept or reject any new information so sent.

Two-sided embodiments may be set up using the techniques discussed above such as sending software as an attachment or sending a link to a website or a file server having the appropriate software available for downloading. Each system may be configured with one or more versions of a personal record for sharing—different versions being designated for different recipients or groups of recipients. For example, a system might be configured to send a business picture to any system requesting a picture but a casual photo (in lieu of or in additional to the business photo) to certain requesters or groups of requesters. Similarly, a user's mobile phone number, pager number or a home phone number may be designated as available to send to certain (but not all) requesters.

Although the illustrative embodiments described above are concerned primarily with e-mail messages, it should be appreciated that the methods of the invention may be applied to any system having nodes that incorporate user-related data. By way of example, but not limitation, such systems may include instant messaging, text messaging, conference calls, video conferencing, file sharing systems, or any system having a sending user (or sending node) and one or more receiving users (or receiving nodes) wherein the nodes or users have access to data that may be of interest to other users or nodes. The data itself may be anything—PIM data and images of users in particular are merely used herein as representative of information (data) that is often desired and often in need of being confirmed, updated or refreshed.

Data exchanged by systems according to the present invention may have an expiration date or time associated therewith that may result in the data being deleted after a certain period of time has elapsed or may cause a warning to be displayed with the data alerting the user to the possible suspect status of the information. The expiration date may be set by the data originator or recipient. In certain embodiments, the storing system may prompt the user to send a request for updated information when a pre-selected period of time has elapsed from the date associated with the data. In yet other embodiments, a sending system may store the date that certain information was sent to a certain requestor and automatically send updated and/or newly available information after a certain period of time has elapsed.

Although the illustrative embodiments have described several different ways in which a request-for-information message may be transmitted, those skilled in the art will appreciate that many methods exist or may be envisioned for effecting such a transmission. For example, the request for information may take the form of an added message header, analogous to the conventional subject, date, sender and recipient fields. The request may be an addendum to the message body at the front (top), end (bottom) or as a sidebar to the message. Such an addendum may be an automatically-generated message such as: "Please send me a picture of yourself; I am missing one from your contact card." Furthermore, a user interface may provide a selection of automatically generated messages. Alternatively, the addendum or sidebar message may be drafted by the user in a preferences pane. Different messages may be associated with different data types or the same message may be used with all data types. The message or addendum may include instructions useful to the recipient in complying with the request. Alternatively, the message or addendum may include a link to such instructions rather than the instructions per se.

While the techniques described herein may be embodied in virtually any structural context, for illustrative purposes including illustration of hardware, software and synchronization/PIM-data background, the following U.S. patent applications are hereby incorporated by reference: "State Based Synchronization" by Bertrand Serlet, filed Jan. 7, 2004 and having application serial number 883541, and having publication number US20060069809A1; "A Method of Synchronizing Between Three or More Devices" by Toby Paterson and Jerome Lebel, having application Ser. No. 10/853,306 and filed May 24, 2004; "A Method of Synchronizing" by Toby Patterson and Jerome Lebel, having application Ser. No. 10/852,926 and filed May 24, 2004; and "Apparatus And Method For Peer-To-Peer N-Way Synchronization In A Decentralized Environment," having application Ser. No. 11/157,647 and filed Jun. 21, 2005

Although the invention has been described in detail with reference to certain preferred embodiments, variations and modifications exist within the scope and spirit of the invention as described and defined in the following claims.

What is claimed is:

1. A process for obtaining certain data comprising:
  displaying, during the composition by a user of a first message in an outgoing electronic communication, a request for user input concerning appending a request for certain data to the outgoing electronic communication; and
  appending, in response to user selection, a second message comprising a pre-selected request for the certain data to the outgoing electronic communication.

2. A process as recited in claim 1 wherein the electronic communication is e-mail.

3. A process as recited in claim 2 wherein the pre-selected request is contained in the header of the e-mail communication.

4. A process as recited in claim 1 wherein the requested data is image data.

5. A process as recited in claim 4 wherein the image data is a photograph of the intended recipient of the outgoing electronic communication.

6. A process as recited in claim 1 further comprising automatically determining whether the intended recipient of the first message in the outgoing electronic communication has a pending request for data from the user.

7. A process as recited in claim 6 further comprising automatically adding the requested data to the outgoing electronic communication if the intended recipient of the outgoing electronic communication has a pending request for data from the user.

8. A process as recited in claim 6 further comprising prompting the user to add the requested data to the outgoing electronic communication if the intended recipient of the outgoing electronic communication has a pending request for data from the user.

9. A process as recited in claim 1 further comprising automatically determining whether data associated with the intended recipient of the outgoing electronic communication is stored in a data repository accessible by the user.

10. A process as recited in claim 9 further comprising automatically determining whether certain data associated with the intended recipient of the outgoing electronic communication is missing from data stored in a data repository accessible by the user.

11. A process as recited in claim 10 further comprising automatically adding a request for missing data to the outgoing electronic communication.

12. A process as recited in claim 10 further comprising prompting the user to add a request for missing data to the outgoing electronic communication.

13. A process as recited in claim 9 further comprising automatically determining whether certain data associated with the intended recipient of the outgoing electronic communication and stored in a data repository accessible by the user has been stored for more than a pre-selected time interval.

14. A process as recited in claim 13 further comprising automatically adding a request for data that has been stored for more than a pre-selected time interval to the outgoing electronic communication.

15. A process as recited in claim 13 further comprising prompting the user to add a request for data that has been stored for more than a pre-selected time interval to the outgoing electronic communication.

16. A process as recited in claim 15 further comprising automatically adding a pre-selected request for data to the outgoing electronic communication in response to user action.

17. A process as recited in claim 16 wherein the pre-selected request is in the form of an e-mail header.

18. A process as recited in claim 16 wherein the pre-selected request is determined by the type of data that has been stored for more than a pre-selected time interval.

19. A process as recited in claim 15 wherein prompting the user comprises displaying a dialog box on a display device.

20. A method for requesting data comprising the steps of:
  providing an option for sender-user composing a first message in an email, the option allowing the sender-user to cause an information request to be included with the email;
  automatically including a second message comprising the information request in the email, in response to an indication by the sender-user; and
  sending the email containing the first message and the second message to a recipient indicated by the sender-user.

21. The method of claim 20 further comprising the step of examining a local data store in order to determine missing information regarding the recipient.

22. The method of claim 20 further comprising the step of examining a local data store in order to determine desirable information regarding the recipient.

23. The method of claim 20 wherein the option is a button.

24. The method of claim 20 wherein the information request is included in an email header.

* * * * *